United States Patent [19]
Crose et al.

[11] Patent Number: 5,443,709
[45] Date of Patent: Aug. 22, 1995

[54] APPARATUS FOR SEPARATING CAFFEINE FROM A LIQUID CONTAINING THE SAME

[75] Inventors: James R. Crose, Chelmsford, Mass.; Alan A. Waldman, Oceanside, N.Y.

[73] Assignee: Imsco, Inc., North Andover, Mass.

[21] Appl. No.: 168,956

[22] Filed: Dec. 17, 1993

[51] Int. Cl.⁶ .............................................. A23F 5/20
[52] U.S. Cl. ...................................... 204/302; 99/275; 99/279; 99/451; 204/186; 426/239
[58] Field of Search ............... 204/186, 302, 304, 305, 204/306, 307, 308; 210/243, 748; 426/237, 238, 239, 490; 99/451, DIG. 13, 275, 279

[56] References Cited

U.S. PATENT DOCUMENTS

| | | | |
|---|---|---|---|
| 1,039,961 | 10/1912 | Klein | 426/427 |
| 2,198,859 | 4/1940 | Burgin et al. | 426/268 |
| 2,375,550 | 5/1945 | Grossman | 426/423 |
| 3,108,876 | 5/1961 | Turken et al. | 426/271 |
| 4,031,251 | 6/1977 | Margolis et al. | 426/387 |
| 4,113,886 | 9/1978 | Katz | 426/422 |
| 4,113,888 | 9/1978 | Henig et al. | 426/422 |
| 4,317,841 | 3/1982 | Brambilla et al. | 426/239 |
| 4,364,964 | 12/1982 | van der Stegen | 426/422 |
| 4,372,837 | 2/1983 | Watson et al. | 204/186 |
| 4,569,739 | 2/1986 | Klinkowski | 204/180.1 |
| 4,786,387 | 11/1988 | Whitlock | 204/183.1 |
| 5,036,365 | 7/1991 | Landa | 355/256 |
| 5,064,515 | 11/1991 | Harapanahalli | 204/151 |
| 5,164,060 | 11/1992 | Eisman et al. | 204/282 |

Primary Examiner—John Niebling
Assistant Examiner—William T. Leader
Attorney, Agent, or Firm—Watov & Kipnes

[57] ABSTRACT

Apparatus and method for decaffeinating a liquid, especially brewed coffee in which caffeine is removed by imposing an electrostatic field in counteracting relationship to the flow of the coffee and drawing the caffeine to and retaining the caffeine on an ionic resin.

9 Claims, 3 Drawing Sheets

APPARATUS FOR SEPARATING CAFFEINE FROM A LIQUID CONTAINING THE SAME

FIELD OF THE INVENTION

The present invention is directed to apparatus and methods for decaffeinating a caffeine-containing liquid, such as brewed coffee, by drawing the caffeine to a caffeine-receiving member by imposing an electrostatic field transverse to the direction of flow of the caffeine-containing liquid.

BACKGROUND OF THE INVENTION

Caffeine is a partially water-soluble alkaloid. The removal of caffeine from natural products such as coffee beans, cocoa beans and tea leaves has resulted in the multibillion dollar decaffeinated beverage industry.

The rise of decaffeinated beverages has resulted in part from the health concerns of ingesting excessive amounts of caffeine. Caffeine stimulates the nervous system. Excessive amounts of caffeine can make people tense, irritable, unable to sleep, and, in some cases, elevate the heart rate to unsafe levels. Caffeine can also irritate the alimentary canal. It is common for people diagnosed with sensitive stomachs, colons and the like to be required, as part of their medical treatment, to refrain from ingesting caffeine.

Generally, caffeine has been removed directly from green or roasted beans or from caffeine-containing liquids by dissolving the caffeine in water or organic solvents or passing the caffeine-containing liquid over an ion exchange resin which attracts the caffeine. For example, L. Klein, U.S. Pat. No. 1,039,961 discloses a process for decaffeinating coffee beans by employing mixtures of two or more alkali solvents. E. Burgen, U.S. Pat. No. 2,198,859 discloses heating raw coffee beans with water in the presence of an adsorption agent, such as activated carbon. H. Grossman, U.S. Pat. No. 2,375,550 employs selective adsorbents such as hydrated silicates to remove caffeine.

H. Turken et al., U.S. Pat. No. 3,108,876 teach passing a coffee concentrate over an ionic exchange resin such as polystyrene sulfonic acid resins, carboxylic acid resins, and polystyrene quaternary amine resins. G. Margolis et al., U.S. Pat. No. 4,031,251 disclose a decaffeination process using a non-ionic hydrophobic resin contacted with an aqueous extract of vegetable material.

S. Katz, U.S. Pat. No. 4,113,886 discloses a process which permits caffeine to diffuse through a porous, hydrophilic membrane using a water-immiscible caffeine-specific solvent with a water phase on the opposite side of the membrane. G. van der Stegen, U.S. Pat. No. 4,364,964 discloses a process for removing caffeine from green coffee beans using a synthetic resin which is produced by a polymer containing aromatic ring systems and polar acidic groups.

Each of these methods suffer from a number of disadvantages. None of the cited methods of decaffeinating a liquid are particularly adapted to producing a decaffeinated beverage in the home. Water and organic solvent employing systems must be performed in a commercial processing facility which adds to the cost of producing the beverage and requires that decaffeinated beverages must be sold separately packaged from caffeinated beverages (e.g. decaffeinated coffee products are sold separately from caffeinated coffee products). In addition, organic solvent systems are disadvantageous because of the environmental concerns of using such chemicals.

The third method, employing synthetic resins to attract the caffeine in a caffeinated beverage, eliminates the use of costly solvent systems. However, the degree of attraction of the caffeine for the resins is limited and therefore such systems do not efficiently remove caffeine from caffeine-containing liquids.

With the increasing market for decaffeinated beverages, it would be a significant advance in the art to provide an effective method of decaffeinating liquids without using solvents. It would be particularly advantageous if such a system could be incorporated into a consumer appliance, such as a coffee maker, to make a decaffeinated beverage in the home.

SUMMARY OF THE INVENTION

The present invention is generally directed to an apparatus and method for removing caffeine from a caffeine-containing liquid which is performed in the absence of organic solvents. The invention can be applied to a household appliance to enable the consumer to decaffeinate a caffeine-containing beverage, such as coffee and tea, in the home.

More specifically, the present invention is directed to an apparatus and method for removing caffeine from a liquid containing the same comprising:

(a) channel means for transporting the liquid containing the caffeine (e.g. brewed coffee) from a source to a caffeine separation means at a controlled rate; and (b) caffeine separation means comprising a first passageway for the flow of the caffeine-containing liquid, electrostatic field generating means in proximity to the first passageway for generating an electrostatic field in counteracting relationship to the direction of flow of the caffeine-containing liquid within the first passageway, of sufficient magnitude to draw the caffeine out of the direction of flow of the caffeine-containing liquid and toward a caffeine-receiving member to thereby form a decaffeinated liquid, and a caffeine-receiving member for receiving the caffeine drawn out of the direction of flow of the caffeine-containing liquid and for retaining the caffeine as the resulting decaffeinated liquid passes through and out of the first passageway.

In accordance with the present invention, the making of a decaffeinated beverage (e.g. decaffeinated coffee) from a caffeine-containing beverage can be performed inexpensively in the absence of organic solvents at home by the consumer.

BRIEF DESCRIPTION OF THE DRAWINGS

The following drawings in which like reference characters illustrate like parts, are illustrative of embodiments of the invention and are not intended to limit the invention as encompassed by the claims forming part of the application.

DETAILED DESCRIPTION OF THE INVENTION

The present invention is directed to a device for removing caffeine from a liquid containing the same in which an electrostatic field is employed to attract and draw the caffeine from the liquid and to retain the caffeine on a substrate while the resulting decaffeinated liquid passes.

As used herein the term "caffeine-containing liquid" shall mean all liquids which contain caffeine. Examples of such caffeine-containing liquids are coffee and tea. The present invention is especially adapted to making decaffeinated coffee or tea from brewed coffee and tea, respectively.

Figure 1:
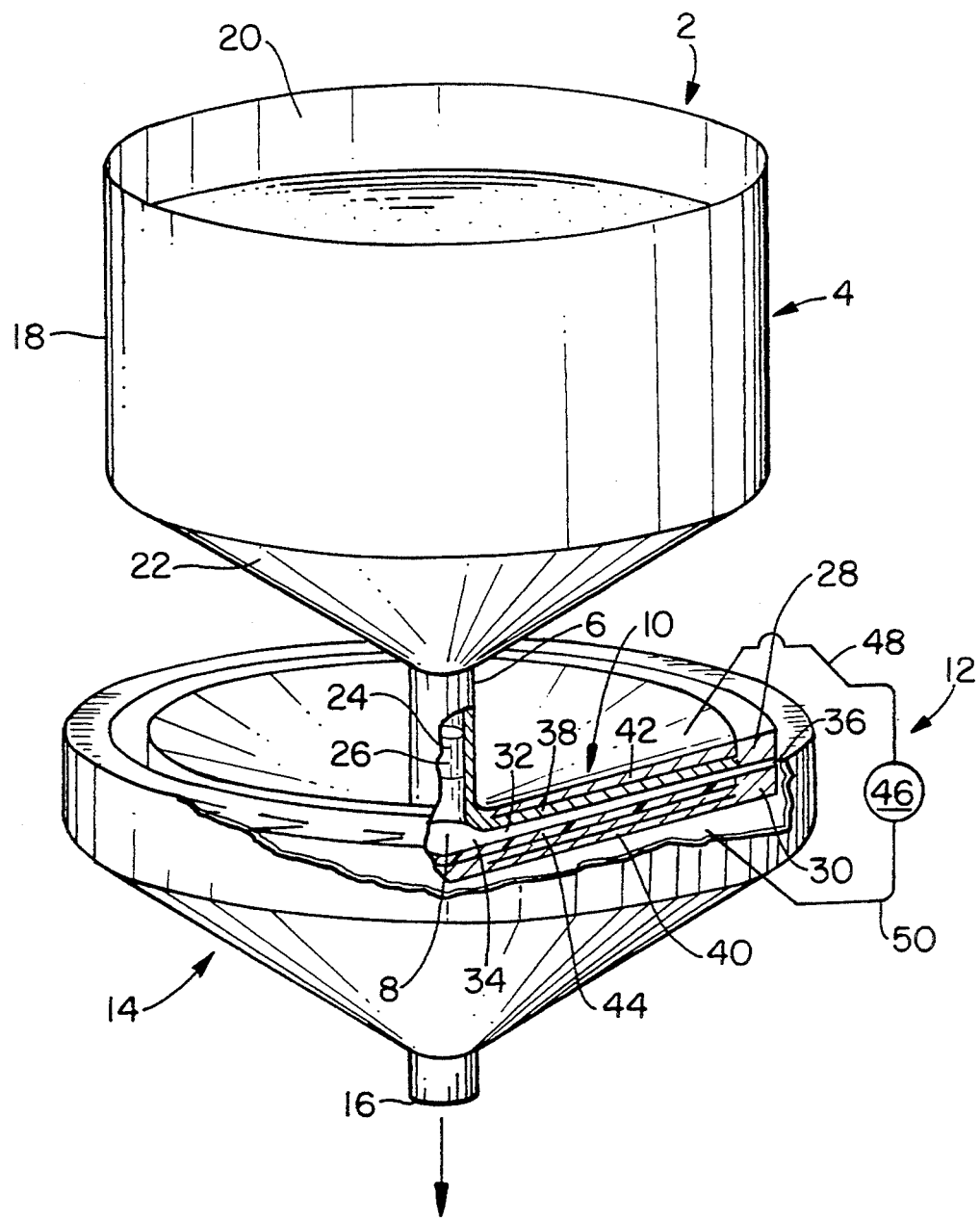
FIG. 1 is a perspective view in partial cross-section of one embodiment of the invention.

Referring to the drawings and particularly FIG. 1, there is shown an embodiment of the invention for removing caffeine from a caffeine-containing liquid. The decaffeinating device is shown generally by the numeral 2 and includes a receiver 4 for the caffeine-containing liquid, a conduit 6, and a receiving region or reservoir 8 for temporarily receiving the caffeine-containing liquid before the same undergoes decaffeination. There is also provided, in accordance with the present invention, a caffeine separator 10, preferably in the shape of an inverted cone, including an assembly 12 for generating an electrostatic field in counteracting relationship to the direction of the flow of the caffeine-containing liquid through the caffeine separator 10 as explained hereinafter. As used herein the expression "generating an electrostatic field in counteracting relationship to the direction of the flow of the caffeine-containing liquid" shall mean an electrostatic field which slows the rate of flow of the caffeine relative to the rate of flow of the liquid and draws the caffeine toward a caffeine receiver. The caffeine separator removes caffeine from the caffeine-containing liquid and thereby produces a decaffeinated liquid which is collected in a collector 14 and removed from the device 2 through an opening 16.

The receiver 4 may be any device which can receive the caffeine-containing liquid and transport the same to the reservoir 8. As shown specifically in FIG. 1, the receiver 4 comprises a receptacle 18, which may be in the shape of a cone having a wide opening 20 which is adapted to receive a caffeine-containing liquid from a source such as a percollator (not shown). A cylindrical body is preferred which allows a significant amount of the caffeine-containing liquid to enter the device 2 while the funnel-shaped base 22 directs the liquid to the conduit 6.

The conduit 6 controls the rate of flow of the caffeine-containing liquid to the caffeine separator 10 and, accordingly, controls the residence time of the caffeine-containing liquid within the electrostatic field. Generally, the longer the residence time, the great the amount of caffeine removed from the liquid.

The conduit 6 is preferably comprised of a tube 24 and a cylindrical pathway 26 positioned along the longitudinal axis of the conduit 6. The diameter of the pathway 26 is selected according to the desired flow rate, but is generally from about 0.050 to 0.070 inch.

The receiver 4 is made of a material which is substantially impervious to the caffeine-containing coffee and is readily washable. Well-known plastics such as food grade polyethylene and polypropylene are suitable for this purpose.

As the caffeine-containing liquid leaves the conduit 6 and enters the reservoir 8, there is a decrease in hydrodynamic pressure due to the high velocity and turbulent flow of the liquid. This pressure dissipates as the caffeine-containing liquid is pooled in the reservoir 8 and moves radially toward the caffeine separator 10. As explained hereinafter, the velocity of the caffeine-containing liquid will continue to decrease through the caffeine separator 10.

In a preferred embodiment of the invention as shown best in FIG. 1, the reservoir 8 and caffeine separator 10 together are in the shape of an inverted cone. This particular design is desired to pool the caffeine-containing liquid and to distribute the caffeine-containing liquid through the caffeine separator 10 at a desired residence time to maximize the efficiency of caffeine removal.

The caffeinator separator 10 includes spaced-apart opposed members or partitions 28, 30 which together define a passageway 32 extending from an entry port 34 to an exit port 36. Operatively associated with the caffeine separator 10 is the electrostatic field generating assembly 12 which includes opposed electrodes 38, 40 which are insulated from each other, by a substrate 42 or a caffeine receiver 44. The caffeine receiver 44 is located along at least a major portion of the passageway 32 and retains the caffeine contained in the caffeine-containing liquid to thereby allow the decaffeinated liquid to flow through the passageway 32 from the entry port 34 to the exit port 36. The caffeine receiver 44 is made of ionic resins, preferably selected from polystyrene sulfonic acid resins, carboxylic acid resins and polystyrene quaternary amine resins and the like.

The electrodes 38 and 40 are positioned within the respective partitions 28, 30. The placement of the electrodes 38, 40 and the operation of the assembly 12 prevents an electric current from flowing between the electrodes 38, 40. In accordance with the present invention, the electrodes 38, 40 are sufficiently insulated from each other so that a high voltage impressed upon one of the electrodes will generate an electrostatic field of sufficient magnitude to increase the extraction rate of the caffeine and draw the charged caffeine out of the flow of the caffeine-containing liquid toward the caffeine receiver 44. To accomplish this, the electrostatic field is generated in a manner which operates in a counteracting relationship to the flow of the caffeine-containing liquid as previously defined. In a preferred embodiment of the invention, the electrostatic field is generated transverse to the direction of flow of the caffeine-containing liquid which provides the maximum extraction of the caffeine.

The electrodes 38, 40 may be made of copper or other suitable conductive material. The electrode 38 is connected to a power supply 46 at a junction 48 and the ground electrode 40 is connected to the power supply 46 at a junction 50.

In one embodiment of the invention, the substrate 42 functions as an insulator, and in a preferred embodiment the caffeine receiver 44 serves as an insulator to prevent the flow of electrical current between the electrodes 38,40. When a voltage is generated, a voltage gradient is produced between the electrodes 38, 40 sufficient to generate the electrostatic field. Examples of insulating materials suitable for the substrate 42 include polyethylene and polypropylene.

The electrodes are preferably arranged so that the caffeine-containing liquid passes through an electrostatic field of variable intensity, most preferably of increasing intensity as the caffeine-containing liquid flows through the caffeine separator. The intensity of the electrostatic field may be increased by arranging the electrodes so that they become closer together.

Figure 2A:
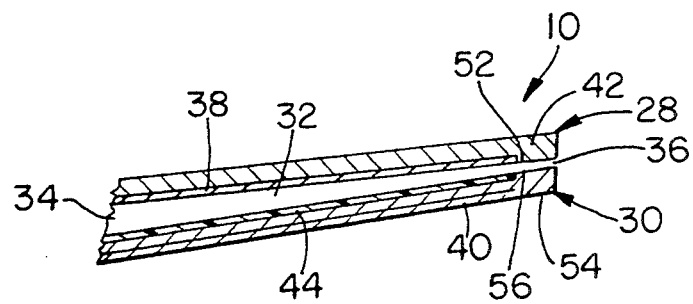
FIG. 2A is a cross-sectional view of one embodiment of the decaffeination device showing the arrangement of the electrodes and the caffeine-receiving member relative to the passageway which receives the caffeine-containing liquid.

Referring to FIG. 2A, there is shown a first arrangement of the electrodes 38, 40 and the caffeine receiver 44 within the caffeine separator 10. The electrode 38 is embedded in the inner surface 52 of the substrate 42 of the partition 28 adjacent the passageway 32. The electrode 40 is embedded in the outer surface 54 of the substrate 42 of the partition 30. The electrodes 38, 40 are shown in FIG. 2A to extend along most of the length of the partitions 28, 30, respectively, terminating just before the exit port 36. The caffeine receiver 44 is positioned along the inner surface 56 of the partition 30.

The partitions 28, 30 are shown in FIG. 2A to converge from the entry port 34 to the exit port 36. Thus, the electrodes 38, 40 come closer together along the passageway 32 towards the exit port 36. For a given voltage imposed on the electrodes 38, 40, the intensity of the electrostatic field generated by the assembly 12 will be the greatest at that region where the electrodes 38, 40 are the closest together along the passageway 32 (i.e. towards the exit port 36 as shown in FIG. 2A). Increasing the intensity of the electrostatic field as the caffeine-containing liquid passes through the passageway 32 improves the extraction rate at which the caffeine is removed from the caffeine-containing liquid.

Figure 2B:
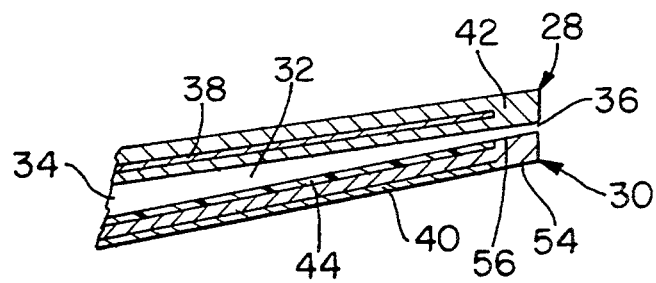
FIG. 2B is a cross-sectional view similar to FIG. 2A of another embodiment of the arrangement of the electrodes and caffeine-receiving member.

In another arrangement as shown in FIG. 2B the electrode 38, is encased within the substrate 42 of the partition 28. The electrode 40 is embedded in the outer surface 54 of the substrate 42 of the partition 30. The caffeine receiver 44 is positioned on the inner surface 56 of the partition 30. As with the arrangement shown in FIG. 2A, the electrodes 34, 36 are insulated from each other and converge toward the exit port 36. The caffeine receiver 44 is positioned so that it may readily receive caffeine from the caffeine-containing liquid which passes through the passageway 32.

Figure 2C:
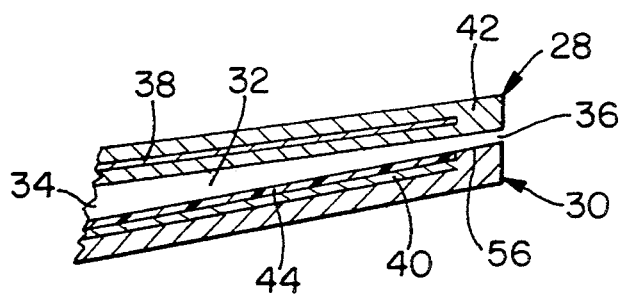
FIG. 2C is a cross-sectional view similar to FIG. 2A of a further embodiment of the arrangement of the electrodes and the caffeine-receiving member.

FIG. 2C shows an arrangement wherein the electrode 38 is encased within the substrate 42. The caffeine receiver 44, as with the embodiments shown in FIGS. 2A and 2B, is embedded within the inner surface 56 of the partition 30. The electrode 40 in this embodiment is positioned immediately below the caffeine receiver 44.

Figure 2D:
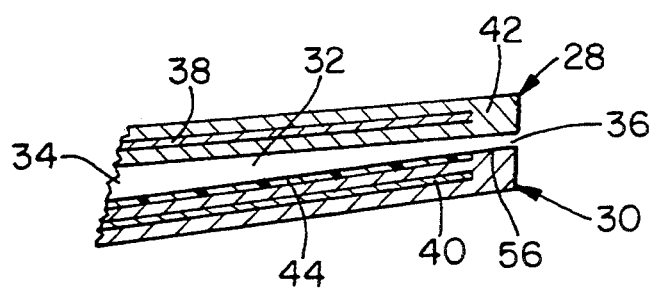
FIG. 2D is a cross-sectional view similar to FIG. 2A of a still further embodiment of the arrangement of the electrodes and the caffeine-receiving member.
Figure 2E:
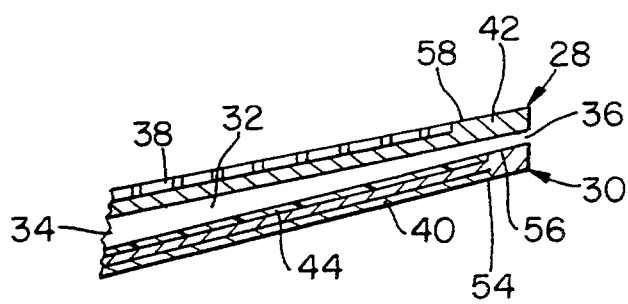
FIG. 2E is a cross-sectional view similar to FIG. 2A of another embodiment of the arrangement of the electrodes and the caffeine-receiving member.
Figure 2F:
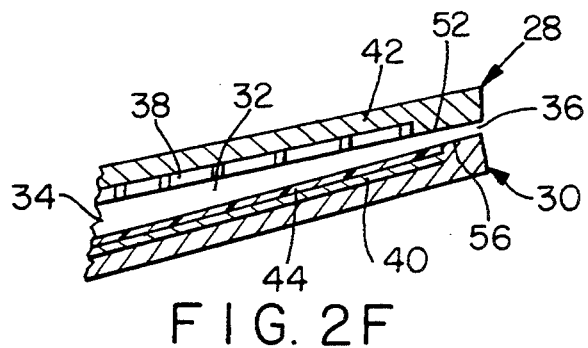
FIG. 2F is a cross-sectional view similar to FIG. 2A of still another embodiment of the arrangement of the electrodes and the caffeine-receiving member.

FIGS. 2D-2F show different arrangements of the electrodes within the partitions 28, 30. The electrode 38 is shown encased within the substrate 42 in FIG. 2D while in FIG. 2E, the electrode 38 is embedded in the outer surface 58 of the partition 28. In FIG. 2F, the electrode 38 is embedded in the inner surface 52 of the partition 28 as described in connection with the embodiment shown in FIG. 2A.

The electrode 40 is encased within the substrate 42 in FIG. 2D. In FIG. 2E, the electrode 40 is embedded within the outer surface 54 of the partition 30 as described above in connection with the embodiment shown in FIG. 2B. The embodiment shown in FIG. 2F has the electrode 40 positioned immediately below the caffeine receiver 44 as described in connection with the embodiment shown in FIG. 2C.

The positioning of the respective electrodes 38, 40 as shown in the arrangements of FIGS. 2A-2F is made to vary the intensity of the electrostatic field generated between the electrodes. Generally, the greater the thickness of the insulation between the electrodes, the lower the intensity of the electrostatic field across the caffeine-containing liquid. For example, for a given voltage, the intensity of electrostatic field generated by the electrode arrangement shown in FIG. 2F will exceed the intensity of the electrostatic field shown in FIG. 2E. This is because the arrangement shown in FIG. 2E provides a greater amount of an insulating material (i.e. the substrate 42) between the electrodes 38 and 40. Accordingly, the intensity of the electrostatic field may be varied by adjusting the relative positions of the electrodes 38, 40 in the respective partitions 28, 30.

The intensity of the electrostatic field is also affected by the distance between the electrodes. As previously described the convergence of the electrodes from the entry port to the exit port intensifies the electrostatic field as the caffeine-containing liquid passes through the caffeine separator. As shown best in FIG. 1, both the top partition 28 and the bottom partition 30 extend radially from the reservoir 8 at a slight incline. In a preferred embodiment of the invention, the angle of incline of the bottom partition 30 is greater than the angle of incline of the top partition 28. The angle of incline of the bottom partition is preferably from about 5° to 9° while the angle of incline of the top partition 28 is from about 2° to 6°. For example, if angle of incline of the top partition is 6° then the angle of incline of the bottom partition should be greater than 6°, preferably about 7° to 9°.

The intensity of the electrostatic field may also be varied by varying the voltage supplied to the electrodes. The greater the voltage, the greater will be the intensity of the electrostatic field. From about 1,000 to 3,000 volts is suitable for removing caffeine from the caffeine-containing liquid.

The effectiveness of caffeine removal is also dependent on the residence time of the caffeine-containing liquid within the caffeine separator 10. The residence time is a function of the amount of the caffeine-containing liquid which passes into the caffeine separator. Accordingly, adjustment of the cross-sectional area of the conduit 6 can provide control over the flow rate of the caffeine-containing liquid.

The removal of the caffeine from the caffeine-containing liquid is premised on the generation of an electrostatic field counteracting the direction of flow of the caffeine-containing liquid, and preferably transverse to the liquid flow. The electrostatic field produces an electrical force which tends to oppose the dominant hydrodynamic flow forces applied to the caffeine molecules as they proceed into and through the passageway 32 of the caffeine separator 10. As a result, the naturally charged caffeine molecules are exposed to the electrostatic force for a longer period of time thereby increasing the likelihood that the caffeine molecules will be drawn out of the liquid flow toward the caffeine receiver 44.

The electrostatic field is generated by an assembly 12 comprised of the electrodes 38, 40 spaced apart and insulated from each other as described above in connection with FIGS. 2A–2F. The electrodes are connected to a D.C. converter powered by a dry cell battery 46, or any D.C. power supply. The power supply 46 must be capable of generating a voltage of at least about 5 to 24 volts to the D.C./D.C. converter.

As previously indicated, the intensity of the electrostatic field may be varied by varying the thickness of the insulator. Typically the thickness of the insulation whether the substrate 42, the caffeine receiver 44 or combination thereof will be in the range of from about 0.030 to 0.050 inch, preferably about 0.040 for most applications. In this regard, a preferred embodiment of the invention is shown in FIG. 2F. The only insulating material between the electrodes 38 and 40 is the caffeine receiver 44. Accordingly, the amount of insulating material between the electrodes is minimized thereby reducing the size of the partitions 28 and 30 and the cost of the caffeine separator 10. It should be noted, however, that if the intensity of the electrostatic field is too great, the voltage imposed on the electrodes may have to be reduced.

After passing through the electrostatic field, the now decaffeinated liquid passes out of the caffeine separator 10 through the exit port 36. The exit port 36 may be in the form of intermittent slots 60 or a single continuous opening (not shown) along the outer rim 62 of the caffeine separator 10.

Figure 3:
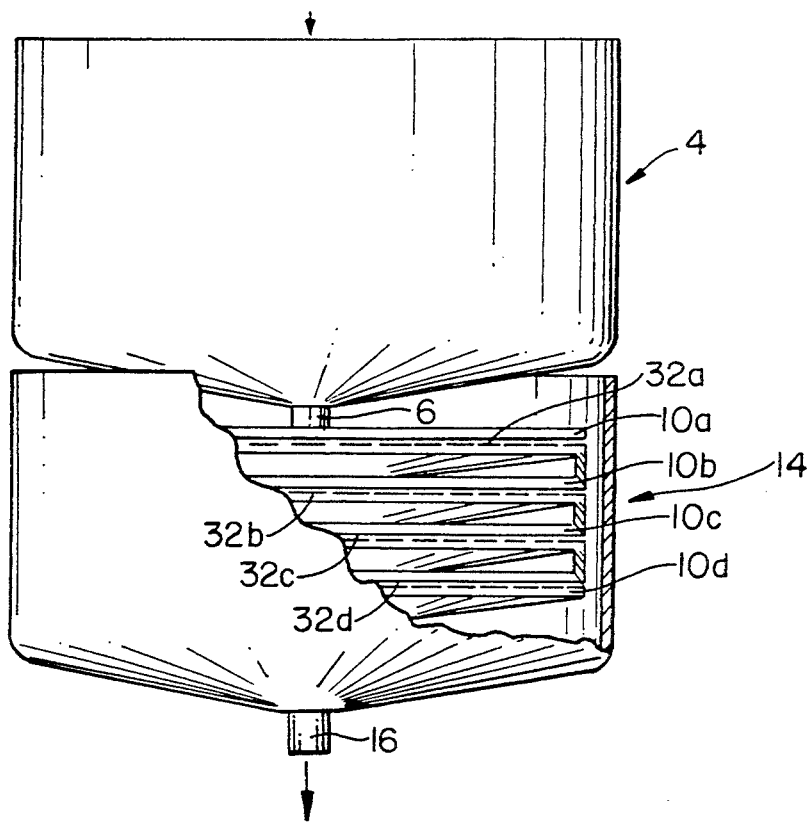
FIG. 3 is a perspective view in partial cross-section of another embodiment of the invention showing a multi-layered arrangement of the electrodes and caffeine-receiving member.

The present invention can be provided with multiple caffeine separators 10 to process a larger amount of the caffeine-containing liquid. Referring to FIG. 3, there is shown a decaffeinating device 70 in which multiple caffeine separators are shown by numerals 10a–10d. Each separator 10 is provided with a passageway 32 (See FIGS. 1 and 2A–2F) for receiving the caffeine-containing liquid. A caffeine receiver 44 and an electrostatic field generating assembly 12 of the type shown in FIGS. 2A–2F and as described previously are also provided as part of each caffeine separator. The caffeine-containing liquid, once rid of the caffeine, leaves the caffeine separator through exit ports 36a–36d.

In each of the embodiments shown in FIGS. 1 and 3, the decaffeinated liquid leaves the caffeine separator 10 through the exit port 36 and drips downwardly where it is collected and consolidated in funnel a 64 having an opening 66. The decaffeinated liquid exits the system through the opening 66 into a cup or decanter (not shown) as required.

The caffeine receiver 44 will require cleaning to remove the caffeine deposited thereon. The device 2 may be constructed so that the receiver 4 may be separated from the collector 14 thereby exposing the caffeine receiver 44 which may then be washed with water to dissolve the caffeine.

Referring to FIG. 1, the operation of the decaffeinating device will now be explained with reference to the production of decaffeinated coffee. Brewed caffeinated coffee is poured into the receiver 4. The coffee flows in a controlled manner through the conduit 6 into the reservoir 8. As the level of the caffeinated coffee rises in the reservoir 8, it flows radially and fills the passageway 32 at a controlled rate so that the residence time of the caffeinated coffee is sufficient to enable the caffeine to be drawn to and retained by the caffeine receiver 44. The flow rate is principally controlled by the cross-sectional area of the conduit 6.

The caffeine is drawn out of the caffeinated coffee by generating an electrostatic field counteracting the direction of flow of the caffeinated coffee, preferably transverse to the flow direction. The electrostatic field, the intensity of which is controlled by the applied voltage, the distance between the electrodes and/or the amount of insulation between the electrodes, draws the caffeine molecules toward the caffeine receiver 44 which retains the caffeine molecules therein allowing the decaffeinated coffee to continue to flow out of the exit port 36 into the funnel 64 for dispensing through the opening 66.

EXAMPLE

A decaffeinator of the type shown in FIG. 1 and of a size adapted to fit within the existing geometry of a 24 oz hot beverage maker (QUICK-CUP manufactured by Hamilton-Beach) is employed herein.

The decaffeinator is made out of a white castable type resin (2651-40 distributed by W.R. Grace & Co.). The upper reservoir is designed to hold approximately 2 cups of brewed coffee. Liquid discharge from the reservoir is controlled by a 0.066 inch diameter conduit provided by a center set-screw.

Inverted conical electrodes for the caffeine separator are fashioned from copper shimstock, approximately 0.005 inch thick, and are attached to their respective substrates, such as polypropylene, by an adhesive. An ionic resin such as polystyrene sulfonic acid resin or carboxylic resin is sprayed over the ground electrode to a depth of 0.045 inch to fabricate a caffeine separator of the type shown in FIG. 2F thereby sealing the ground electrode from the exposed, upper electrode.

The bottom collector or funnel is fastened to the upper reservoir which contains the electrostatic field assembly within the unit for safety purposes. The electrostatic field assembly is capable of generating up to about 1,000 volts from a D.C. converter. An electrical interlock disables the electrical circuit when the bottom funnel is removed, for example when cleaning the unit.

In operation, the power is turned on and the reservoir is charged with brewed caffeinated coffee. The caffeinated coffee liquid flows through the center opening by gravity into the decaffeinating zone. The decaffeinating zone is comprised of two inverted converging electrified cones, insulated from one another by the ionic resin. An electrostatic field is generated of sufficient intensity to remove the caffeine from the liquid. As the liquid fills the void between the converging cones a continuous reduction in liquid velocity occurs while simultaneously the electrostatic field intensity is increasing thereby improving the caffeine collection efficiency of the device.

A change in the applied voltage can provide control over the caffeine extraction rate. Since the caffeine molecules are of the opposite polarity they are preferentially driven toward the electrode beneath the ionic resin thereby purging tangentially the liquid of caffeine. The process of decaffeination is continuous until the reservoir is exhausted. Accordingly, the decaffeinated coffee which is treated is collected and held at the desired temperature until consumed. In accordance with this embodiment, 2 cups of decaffeinated coffee can be produced in approximately two minutes.

The unit is then disassembled, cleaned and reassembled for the next cycle. It is anticipated that cleaning the ionic resin surface of caffeine rejuvenates the surface over an extended period thereby eliminating the replacement of filters after each use of the apparatus.

What we claim is:

1. A device for removing caffeine from a conductive liquid containing the same comprising:
   (a) channel means for transporting said conductive liquid to a caffeine separation means; and
   (b) caffeine separation means comprising:
      (i) an inlet for receiving the conductive fluid from the channel means,
      (ii) an outlet positioned upwardly and outwardly from the inlet for discharging a substantially caffeine-free liquid,
      (iii) a passageway angled upwardly from the inlet to the outlet for transporting the conductive liquid while the caffeine is being removed therefrom, said passageway comprising at least one pair of opposed partitions, each of said partitions containing an electrode with at least one of said electrodes being insulated, a porous ionic resin-containing layer between said partitions adapted to receive and retain the caffeine therein, and
      (iv) an electrostatic field generating means for impressing a voltage on one of the electrodes to thereby generate an electrostatic field transverse to the direction of flow of the conductive fluid, wherein the caffeine is drawn out of the direction of flow of the conductive fluid and retained by the ionic resin-containing layer.

2. The device of claim 1, wherein the partitions converge from the inlet to the outlet to thereby increase the electrostatic field intensity.

3. The device of claim 2 comprising an upper partition being angled upwardly at from about 2° to 6° and a lower partition angled upwardly at from about 5° to 9°.

4. The device of claim 1, comprising a first partition having an insulated electrode and a second partition having an insulated electrode.

5. The device of claim 1 comprising upper and lower partitions, wherein the upper partition contains an uninsulated electrode and the lower partition contains an insulated electrode.

6. The device of claim 1, wherein the thickness of the insulation is from about 0.030 to 0.050 inch.

7. The device of claim 1, wherein the channel means comprises a funnel for receiving said conductive liquid and a reservoir for receiving the liquid from the funnel and for passing said liquid to the passageway.

8. The device of claim 1, wherein the caffeine separation means comprises multiple parallel pairs of opposed partitions arranged in layers to form a multilayered caffeine separation means.

9. The device of claim 1, wherein the ionic resin is selected from the group consisting of polystyrene sulfonic acid resins, carboxylic acid resins and polystyrene quaternary amine resins.

* * * * *